United States Patent
Sheng et al.

(10) Patent No.: US 12,058,577 B2
(45) Date of Patent: Aug. 6, 2024

(54) LIGHTWEIGHT INTER-SATELLITE HANDOVER DEVICE AND METHOD FOR MEGA LOW-EARTH-ORBIT SATELLITE NETWORKS

(71) Applicant: Xidian University, Xi'an (CN)

(72) Inventors: Min Sheng, Xi'an (CN); Di Zhou, Xi'an (CN); Liuying Wang, Xi'an (CN); Sijing Ji, Xi'an (CN); Jiandong Li, Xi'an (CN); Weigang Bai, Xi'an (CN); Yan Shi, Xi'an (CN); Haoran Li, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 329 days.

(21) Appl. No.: 17/723,423

(22) Filed: Apr. 18, 2022

(65) Prior Publication Data
US 2022/0345967 A1    Oct. 27, 2022

(30) Foreign Application Priority Data
Apr. 19, 2021 (CN) ............ 2021104182687

(51) Int. Cl.
*H04W 36/08* (2009.01)
*H04B 7/195* (2006.01)
*H04W 36/00* (2009.01)

(52) U.S. Cl.
CPC .......... *H04W 36/08* (2013.01); *H04B 7/195* (2013.01); *H04W 36/0072* (2013.01); *H04W 36/0083* (2013.01)

(58) Field of Classification Search
CPC ............ H04W 36/08; H04W 36/0072; H04W 36/0083; H04B 7/195
(Continued)

(56) References Cited

U.S. PATENT DOCUMENTS 6,298,073 B1 * 10/2001 LeFever ............... H04B 7/2125
375/372
11,967,123 B1 * 4/2024 Shi .................. G06V 10/28
(Continued)

FOREIGN PATENT DOCUMENTS

CN        107241135 A    10/2017
CN        110809292 A    2/2020

OTHER PUBLICATIONS

T. V. Padmavathy, V. Kavitha and S. Radha, "Residual Energy Extraction Using Centralized Scheduling Algorithm", 2008 IEEE, pp. 1-4.
(Continued)

*Primary Examiner* — April G Gonzales
(74) *Attorney, Agent, or Firm* — Zhigang Ma

(57) ABSTRACT

Lightweight inter-satellite handover device and method for a mega LEO satellite network are provided. An attribute extraction sub-module extracts attributes of handover users in a user information storage unit. Based on the attributes of the handover users, a cluster sub-module clusters the handover users into user clusters. A decision set generator sub-module generates target satellite sets of the user clusters, determines each target satellite of the target satellite sets of the user clusters of each LEO satellite whether belongs to LEO satellites in a management domain of a handover decision point of managing the LEO satellite based on management domain information in a LEO satellite information storage unit, and if YES, performing inter-satellite handover by a centralized decision unit, otherwise performing inter-satellite handover by a distributed decision unit. Therefore, lightweight inter-satellite handover is achieved, cost of handover decision is reduced, and resource utilization of LEO satellite is increased.

7 Claims, 3 Drawing Sheets

(58) Field of Classification Search
USPC .......................................................... 455/12.1
See application file for complete search history.

(56) References Cited

U.S. PATENT DOCUMENTS

| | | | |
|---|---|---|---|
| 2004/0137842 A1* | 7/2004 | Iwata | H04B 7/18541 |
| | | | 455/12.1 |
| 2015/0271730 A1* | 9/2015 | Benammar | H04W 36/30 |
| | | | 455/436 |
| 2017/0105153 A1* | 4/2017 | Ashrafi | H04W 36/302 |
| 2018/0376392 A1* | 12/2018 | Wu | H04W 72/0446 |
| 2018/0376393 A1* | 12/2018 | Wu | H04L 1/0057 |
| 2019/0230568 A1* | 7/2019 | Arur | H04B 7/18541 |
| 2019/0306778 A1* | 10/2019 | Scott | H04N 21/2665 |

OTHER PUBLICATIONS

M. Theodorou and M. Paterakis, "Design and performance evaluation of a Distributed algorithm for heterogeneous multichannel CRNs", 2016 IEEE, pp. 309-314.
J. Sharma, P.-A. Andersen, O.-C. Granmo and M. Goodwin, "Deep Q-Learning with Q-Matrix Transfer Learning for Novel Fire Evacuation Environment", IEEE Transactions on Systems, Man, and Cybernetics: System, Dec. 2021, pp. 7363-7381, vol. 51, No. 12.
D. Niyato et al. "Dynamics of Network Selection in Heterogeneous Wireless Networks: An Evolutionary Game Approach",IEEE Transactions on Vehicular Technology, May 2009, pp. 2008-2017, vol. 58, No. 4.
Di Xiaoqiang et al., "Research on LEO satellite handover algorithm based on evolutionary game", Journal of NanJing University (Natrual Science), Jul. 2018, pp. 855-862, vol. 54, No. 4.

* cited by examiner

LIGHTWEIGHT INTER-SATELLITE HANDOVER DEVICE AND METHOD FOR MEGA LOW-EARTH-ORBIT SATELLITE NETWORKS

FIELD OF DISCLOSURE

The present disclosure relates to the field of communication technologies, and more particularly to lightweight inter-satellite handover device and method for a mega low-earth-orbit (LEO) satellite network in the field of satellite communication technology. The present disclosure can be used for target satellite selections of handover users in a mega LEO satellite network, by clustering the handover users based on attributes of handover users through a fuzzy C-mean (FCM) clustering method to form user clusters, and by using middle-earth-orbit (MEO) satellites or ground stations as handover decision points, the purpose of selecting target satellites for the user clusters can be achieved.

BACKGROUND OF DISCLOSURE

A space-ground integrated information network with a satellite constellation system as an important part is an important network infrastructure that supports Chinese economic development and defense information construction, and has become a key development direction of Chinese "new infrastructure construction". In order to meet the growing demand for broadband wireless access, satellite constellations are gradually becoming large-scale, and will eventually form mega satellite constellations composed of tens of thousands of satellites. Mega LEO satellite constellations have attracted wide attention from academia and industry due to their low cost and low delay characteristics, and a typical constellation thereof is the Space-X system. The Space-X system has been launched more than 600 low-orbit satellites, and the number of satellites finally will reach forty thousand. The mega LEO satellite constellation has unique advantages of realizing global seamless connection with "two-poles coverage", integrating with 5G application scenarios with "low latency", and realizing cost control with "batch construction", however the LEO satellite has characteristics of large angular velocity and high-speed movement, resulting in problems of a short visible time for a user and that single satellite cannot provide continuous service for the user. Moreover, the increase of the scale of users in quantity would bring about problems such as difficult selection of users' target satellites, high cost of inter-satellite handover decision-making, and load imbalance of satellites, resulting in low inter-satellite handover efficiency and low utilization of satellite resources. In order to ensure the service continuity of users and maintain satellite load balancing, how to efficiently select target satellites for users is a key problem to be solved for the inter-satellite handover technology of the mega LEO satellite network.

A patent application document with an applicant of Beijing University of Posts and Telecommunications, an application No. 201710530650.0 and a publication No. CN107241135A, entitled "a satellite network handover method and device" and filed on Jun. 30, 2017, discloses a satellite handover method and a satellite handover device. The device published by the patent application includes a model determination module, an input quantity acquisition module, a reasoning result determination module, a handover factor determination module, and a handover module. The input quantity acquisition module needs to acquire a user terminal and at least one input quantity of at least one satellite covering the user terminal. The handover module finally selects a handover satellite corresponding to a maximum handover factor as a target satellite based on handover factors of satellites provided by the handover factor module, and switches the user terminal to the target satellite. The device may have deficiencies that the input quantity module does not consider when the number of input quantities increases, the number of fuzzy inference criteria will grow exponentially and the complexity of computation will increase, which would greatly increase the time for fuzzy reasoning and thus a decision time for target satellite selection will be prolonged.

Another patent application document with applicants of Beijing Institute of Technology and 54th Research Institute of China Electronics Technology Group Corporation, an application No. 201911102886.X and a publication No. CN110809292A, entitled "a joint handover method based on load balancing in LEO satellite communication" and filed on Nov. 12, 2019, discloses a satellite handover method. Specific steps of the method are that: step 1, judging whether there is an overloaded satellite to determine whether to trigger handover, and selecting an appropriate target satellite by a target satellite selection method of a multi-attribute decision based on signal intensities of adjacent satellites received by a mobile user and loads of the adjacent satellites; step 2, judging whether a time of reference signal reception powers and reference signal reception qualities of the source satellite and the target satellite satisfying a handover trigger condition is greater than a time hysteresis threshold to decide whether to trigger handover; and step 3, if both the step 1 and step 2 satisfy handover trigger conditions, carrying out a handover as per an inter-satellite handover process as proposed. The method may have deficiencies that the multi-attribute decision method is excessively dependent on the calculation method of weights, the application in the LEO satellite network will affect the reliability of handover selection decision, resulting in the decline of resource utilization of LEO satellites.

SUMMARY OF THE DISCLOSURE

In view of the deficiencies in the related technologies, an objective of the present disclosure is to provide a lightweight inter-satellite handover device and a lightweight inter-satellite handover method for a mega LEO satellite network, which may solve the problems of the decision time for target satellite selection being prolonged and the cost of handover decision being increased when the number of handover users increases in the mega LEO satellite network, and the problems of unbalanced loads of LEO satellites and decreased resource utilization of LEO satellites caused by the unreliability of handover selection decision.

A solution for achieving the objective is that, based on attributes of handover users of each LEO satellite in a mega LEO satellite network, aiming at the problem of the decision time of target satellite selection being prolonged when the number of handover users increases, a cluster sub-module is used to form multiple (i.e., more than one) user clusters by clustering all the handover users through a FCM clustering method and thereby obtain cluster heads of user clusters, and a target satellite selected for the cluster head of each user cluster is used as the target satellite selected for all users in the user cluster, which can reduce the decision time of target satellite selection and reduce the cost of handover decision. By determining each target satellite in target satellite sets for all the user clusters of each LEO satellite whether belongs to LEO satellites in a management domain of a handover decision point of managing the LEO satellite, when each target satellite in the target satellite sets for all the user clusters of each LEO satellite belongs to the LEO satellites in the management domain of the handover decision point of managing the LEO satellite, a centralized decision unit is used to carry out centralized inter-satellite handovers on all the user clusters of each LEO satellite, otherwise a distributed decision unit is used to carry out distributed inter-satellite handovers on all the user clusters of each LEO satellite, which can ensure the load balancing of LEO satellites and improve the resource utilization of LEO satellites.

An inter-satellite handover device according to the present disclosure may include: a management information storage function module and a handover target decision function module, both configured in a handover decision point. The management information storage function module includes a LEO satellite information storage unit and a user information storage unit. The handover target decision function module includes an attribute extraction sub-module, a cluster sub-module, a decision set generator sub-module and a decision sub-module. The decision sub-module includes a centralized decision unit and a distributed decision unit. In some embodiments, the management information storage function module including the LEO satellite information storage unit and the user information storage unit, and the handover target decision function module including the attribute extraction sub-module, the cluster sub-module, the decision set generator sub-module and the decision sub-module having the centralized decision unit and the distributed decision unit are software modules stored in one or more memories and executable by one or more processors coupled to the one or more memories.

The LEO satellite information storage unit is configured (i.e., structured and arranged) to store management domain information of the handover decision point and output the management domain information to the decision set generator sub-module.

The user information storage unit is configured to store the attribute of each of the handover users in a management domain of the handover decision point and output the stored information to the attribute extraction sub-module.

The attribute extraction sub-module is configured to extract the attribute of each of the handover users of each of the LEO satellites in the management domain of the handover decision point and output the extracted information to the cluster sub-module.

The cluster sub-module is configured to perform clustering based on the attribute of each of the handover users of each of the LEO satellites and determine cluster heads of the user clusters, the determination of cluster heads of user clusters comprises: determining a number M of the user clusters based on the number of the handover users of each of the LEO satellites, and classifying the handover users with target attribute values (e.g., with similar or equal attribute values) into one user cluster by using fuzzy c-mean (FCM) clustering to obtain the cluster head of the user cluster.

The decision set generator sub-module is configured to generate target satellite sets of the user clusters, determine each of the target satellites in the target satellite sets of the user clusters of each of the LEO satellites whether belongs to the LEO satellites in the management domain of the handover decision point of managing the LEO satellite based on the management domain information in the LEO satellite information storage unit, and perform centralized inter-satellite handovers on the user clusters of each of the LEO satellites by the centralized decision unit when each of the target satellites in the target satellite sets of the user clusters of each of the LEO satellites belongs to the LEO satellites in the management domain of the handover decision point of managing the LEO satellite, otherwise perform distributed inter-satellite handovers on the user clusters of each of the LEO satellites by the distributed decision unit.

An inter-satellite handover method according to the present disclosure may include step (1) through step (8) as follows:

(1) connecting the handover user in the mega LEO satellite network to any one LEO satellite visible to the handover user;

(2) storing management domain information of the handover decision point and outputting the management domain information to the decision set generator sub-module by the LEO satellite information storage unit, storing the attribute of each of the handover users in the management domain and outputting the stored information to the attribute extraction sub-module by the user information storage unit;

(3) extracting the attribute of each of the handover users of each of the LEO satellites in the management domain of the handover decision point and outputting the extracted information to the cluster sub-module by the attribute extraction sub-module, (4) performing clustering based on the attribute of each of the handover users of each of the LEO satellites and determining cluster heads of user clusters by the cluster sub-module, the operation of determining cluster heads of user clusters includes: determining a number M of the user clusters based on the number of the handover users of each of the LEO satellites, and classifying the handover users with target attribute values (e.g., with similar or equal attribute values) into one user cluster by using FCM clustering to obtain the cluster head of the user cluster, where M is a positive integer greater than 1;

(5) generating a target satellite set of each of the user clusters by the decision set generator sub-module, which may be carried out as per step (5a) step (5d) as follows:

(5a) periodically broadcasting, by each of the satellites in the mega LEO satellite network, resource information of the satellite;

(5b) forming, by each handover user, a measurement report of the handover user based on received broadcast information and a signal intensity of the broadcast information;

(5c) feeding back, by each handover user, the measurement report to LEO satellite connected thereto; feeding back, by the LEO satellite, the received measurement report to the handover decision point of managing the LEO satellite; and receiving, by the decision set generator sub-module in the handover decision point, the measurement report of each handover user;

(5d) classifying, by the decision set generator sub-module, the received measurement reports of the handover users into M groups based on the M user clusters; and acquiring the target satellite set of each of the user clusters according to a corresponding group of measurement reports;

(6) determining, by the decision set generator sub-module, each of the target satellites in the target satellite sets of the user clusters of each of the LEO satellites whether belongs to the LEO satellites in the management domain of the handover decision point of managing the LEO satellite based on the management domain information in the LEO satellite information storage unit, and executing step (7) when each of the target satellites in the target satellite sets of the user clusters of each of the LEO satellites belongs to the LEO satellites in the management domain of the handover decision point of managing the LEO satellite, otherwise executing step (8);

(7) performing centralized inter-satellite handovers on the user clusters of each of the LEO satellites by the centralized decision unit, which may be carried out as per step (7a)~step (7c) as follows:

(7a) collecting the user clusters with identical target satellite sets of each LEO satellite as a population;

(7b) taking a target satellite selected for the cluster head of each user cluster as the target satellite selected for users in the user cluster;

(7c) switching each user cluster in each population of each LEO satellite to the target satellite by a population evolution method;

(8) performing distributed inter-satellite handovers on the user clusters of each of the LEO satellites by the distributed decision unit, which may be carried out as per step (8a)~step (8c) as follows:

(8a) collecting the user clusters with identical target satellite sets of each LEO satellite as a population;

(8b) taking a target satellite selected for the cluster head of each user cluster as the target satellite selected for users in the user cluster;

(8c) switching each user cluster in each population of each LEO satellite to the target satellite by a distributed Q-learning method.

Compared with the related technologies, the present disclosure may have advantages as follows.

First, since the attribute extraction sub-module in the device of the present disclosure can extract the attributes of handover users of each LEO satellite in a management domain of a handover decision point, all handover users in each LEO satellite can be clustered by FCM clustering method into user clusters to obtain cluster heads of user clusters, and the target satellite selected for the cluster head of each user cluster is used as a target satellite selected for all users in the user cluster, which can overcome the problems of the decision time of target satellite selection being prolonged and the cost of handover decision being increased in the related technologies caused by the increase of the number of handover users, so that the device of the present disclosure may have advantages of reducing the decision time of target satellite selection and reducing the cost of handover decision.

Second, in the inter-satellite handover method according to the present disclosure, based on the attributes of handover users of each LEO satellite in a mega LEO satellite network, all handover users are clustered to form multiple user clusters, when each target satellite in target satellite sets of all user clusters of each LEO satellite belongs to LEO satellites in a management domain of the handover decision point of managing the LEO satellite, all user clusters of each LEO satellite are performed with centralized inter-satellite handovers, otherwise all user clusters in each the LEO satellite are performed with distributed inter-satellite handovers, which can overcome the problem of decrease of resource utilization of LEO satellite caused by unreliability in the inter-satellite handover method of the related technologies, so that the present disclosure can ensure load balancing of LEO satellite and improve the resource utilization of LEO satellite, while providing a reliable inter-satellite handover method for handover users.

DETAILED DESCRIPTION OF EMBODIMENTS

The present disclosure will be further described below with reference to the accompanying drawings.

Figure 1:
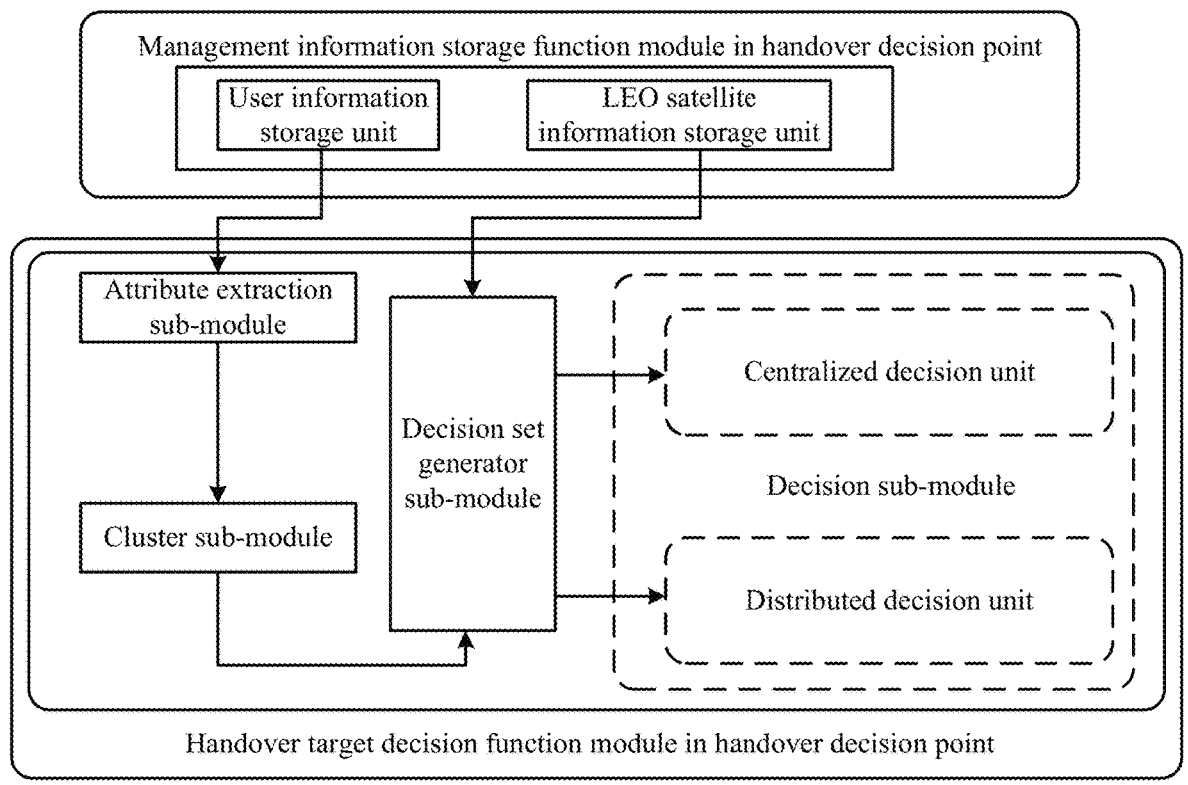
FIG. 1 illustrates a schematic diagram of a device according to the present disclosure.

Referring to FIG. 1, an inter-satellite handover device according to the present disclosure will be further described.

Specifically, a lightweight inter-satellite handover device for a mega LEO satellite network may include: a management information storage function module and a handover target decision function module, both configured in a handover decision point. The management information storage function module may include a LEO satellite information storage unit and a user information storage unit. The handover target decision function module may include an attribute extraction sub-module, a cluster sub-module, a decision set generator sub-module, and a decision sub-module. The decision sub-module may include a centralized decision unit and a distributed decision unit. In some embodiments, the management information storage function module, the LEO satellite information storage unit, the user information storage unit, the handover target decision function module, the attribute extraction sub-module, the cluster sub-module, the decision set generator sub-module, the decision sub-module, the centralized decision unit and the distributed decision unit are software modules stored in one or more memories of the handover decision point and executable by one or more processors of the handover decision point coupled to the one or more memories.

The LEO satellite information storage unit is configured (i.e., structured and arranged) to store management domain information of the handover decision point, and output the management domain information to the decision set generator sub-module.

The user information storage unit is configured to store attributes of handover users in a management domain of the handover decision point, and output stored information to the attribute extraction sub-module.

The attribute extraction sub-module is configured to extract the attribute of each of the handover users of each of the LEO satellites in the management domain of the handover decision point, and output extracted information to the cluster sub-module.

The cluster sub-module is configured to carry out clustering based on the attribute of each of the handover users of each of the LEO satellites, and determine a cluster head of each user cluster, including: determining the number M of user clusters according to the number of the handover users of each of the LEO satellites, and classifying the handover users with similar attribute values or equal attribute values into one user cluster and thereby obtain the cluster head of the user cluster.

The decision set generator sub-module is configured to generate target satellite sets of the user clusters, determine each of the target satellites in the target satellite sets of all the user clusters of each of the LEO satellites whether belongs to LEO satellites in the management domain of the handover decision point of managing the LEO satellite based on the management domain information in the LEO satellite information storage unit, and carry out centralized inter-satellite handovers on all the user clusters of each of the LEO satellites by the centralized decision unit in response that each of the target satellites in the target satellite sets of all the user clusters of each of the LEO satellites belongs to the LEO satellites in the management domain of the handover decision point of managing the LEO satellite or carry out distributed inter-satellite handovers on all the user clusters of each of the LEO satellites by the distributed decision unit. In an illustrated embodiment, the handover decision point of managing all the target satellites in the target satellite sets is used as a centralized control entity to perform the centralized inter-satellite handovers, or multiple handover decision points of managing the target satellites in the target satellite sets are used as distributed control entities to perform the distributed inter-satellite handovers.

Figure 2:
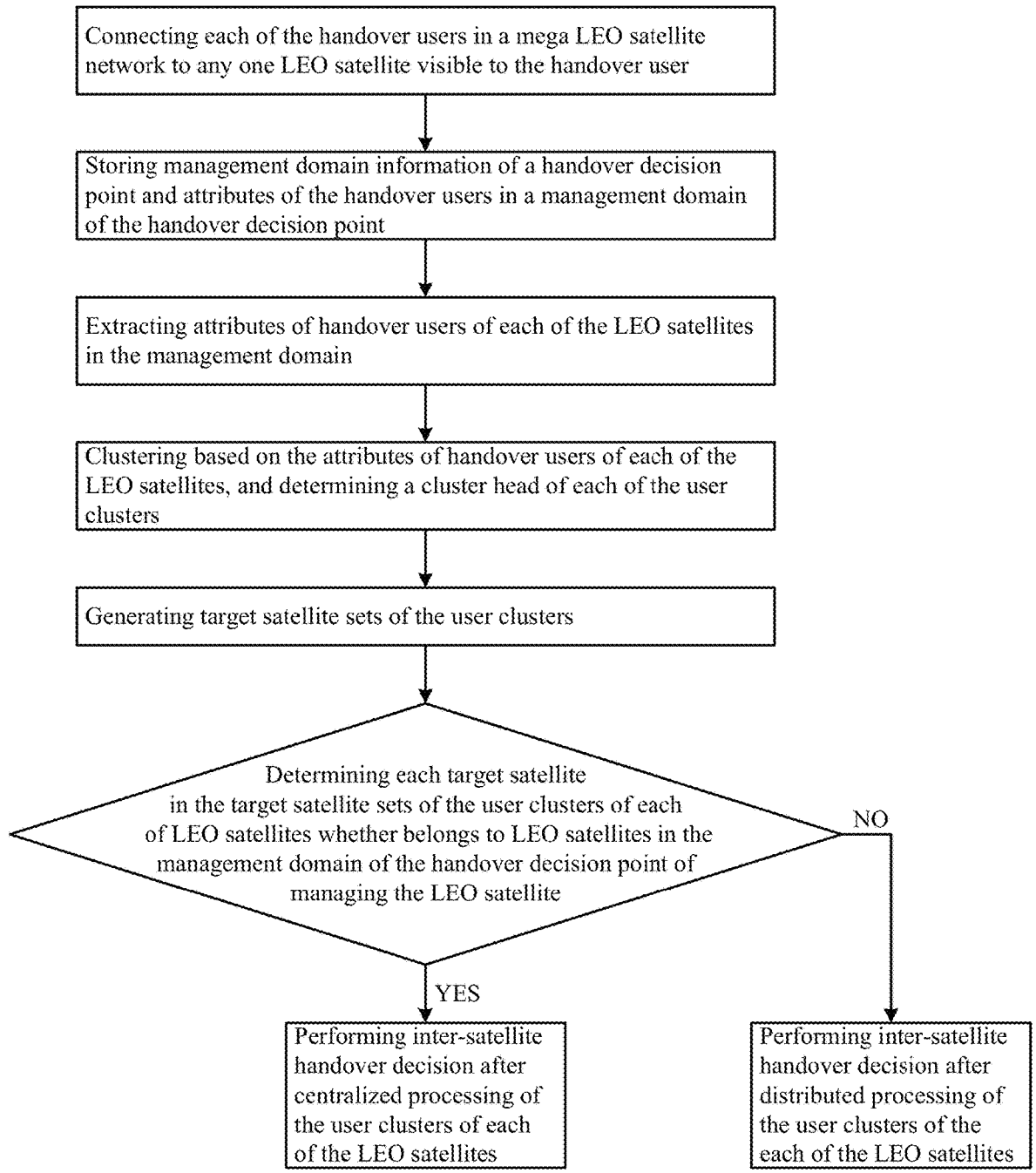
FIG. 2 illustrates a flowchart of a method according to the present disclosure.

Referring to FIG. 2, an inter-satellite handover method according to the present disclosure will be further described.

In step 1, each of the handover users in a mega LEO satellite network is connected to any one LEO satellite visible to the handover user.

In step 2, the LEO satellite information storage unit stores management domain information of a handover decision point and outputs the management domain information to the decision set generator sub-module; and the user information storage unit stores attributes of handover users in a management domain of the handover decision point and outputs stored information to the attribute extraction sub-module.

In particular, the management domain information of the handover decision point may refer to that: in a region where ground station deployment is restricted, a MEO satellite is used as the handover decision point, and a ground station is used as the handover decision point in an unrestricted region, and the region where ground station deployment is restricted may be a desert, an ocean, or a mountainous area. The management domain information of the handover decision point may include the LEO satellites as managed, all handover users of each of the LEO satellites, and a coverage area served by each of the LEO satellites for the handover users. Each of the LEO satellites is only within the management domain of a handover decision point. The handover decision point is responsible for target satellite selection of the handover users in the management domain. There may be no information interaction between handover decision points.

The attribute of each handover user may include bandwidth requirement, satisfaction with satellite network service to the user, and satisfaction with bandwidth price to the user. A value of satisfaction with satellite network service may be in a range of [1.2, 2.0], and a value of satisfaction with bandwidth price may be in a range of [1.2, 3.0].

In step 3, the attribute extraction sub-module extracts attributes of handover users of each LEO satellite in the management domain of the handover decision point.

In step 4, the cluster sub-module performs clustering based on the attributes of the handover users of each LEO satellite to form user clusters, and determines a cluster head of each of the user clusters.

In particular, the number M of the user clusters may be determined based on the number of the handover users of each LEO satellite, the handover users with similar or equal attribute values are classified into one user cluster and then the cluster head of the user cluster is obtained.

In step 5, the decision set generator sub-module generates a target satellite set for each of the user clusters.

Specifically, each satellite in the mega LEO satellite network may periodically broadcast resource information of the satellite.

The resource information of the satellite may include remaining bandwidth resource of the satellite, bandwidth price of the satellite, and anti-interference performance of the satellite.

A measurement report of each of the handover users is formed based on broadcast information received by the user and a signal intensity of the broadcast information.

Each of the handover users may feedback the measurement report to the LEO satellite connected thereto. The LEO satellite may feedback the received measurement report to the handover decision point of managing the LEO satellite. The decision set generator sub-module in the handover decision point may receive the measurement report of each of the handover users.

The decision set generator sub-module may classify the received measurement reports of the handover users into M groups based on the clustered M user clusters, and acquire the target satellite set of each of the user clusters by a corresponding group of measurement reports.

In step 6, the decision set generator sub-module determines each target satellite in the target satellite sets of all the user clusters of each LEO satellite whether belongs to LEO satellites in the management domain of the handover decision point of managing the LEO satellite based on the management domain information in the LEO satellite information storage unit, if YES, going to step 7, otherwise going to step 8.

In step 7, the centralized decision unit performs centralized inter-satellite handovers on all the user clusters of each LEO satellite. As an illustrated embodiment, a core idea of an algorithm for the centralized inter-satellite handovers can refer to that of the centralized scheduling algorithm proposed by T V Padmavathy, V Kavitha and S. Radha, entitled "*Residual Energy Extraction Using Centralized Scheduling Algorithm*", 2008 *IEEE*, pp. 1-4.

In particular, the user clusters with identical target satellite sets of each LEO satellite may be collected as a population.

The target satellite selected for the cluster head of each user cluster may be used as the target satellite selected for all users in the user cluster.

By using a population evolution algorithm, each user cluster of each population in each LEO satellite may be switched to the selected target satellite.

The population evolution algorithm may include steps as follows:

In the $1^{st}$ step, selecting an unselected user cluster from the M user clusters of each LEO satellite.

In the $2^{nd}$ step, calculating, by the handover decision point, a utility function $U_i^{p,m}(X)$ for the cluster head of the selected user cluster which selects any one target satellite from the corresponding target satellite set in the corresponding population and a utility function $\overline{U}^p(X)$ of the corresponding population. $U_i^{p,m}(X)$ can be calculated by the following formula:

$$U_i^{p,m}(X) = (1+d_m)^{\alpha_i} \times u' \times \left( \frac{c_i^{(p)}}{\sum_{p'=1}^{P} N^{(p')} \times x_{i'}^{(p')}} \right) - w_m \times b_m \times q_i \times \sum_{p'=1}^{P} \left( N^{(p')} \times x_{i'}^{(p')} \right)$$

Where, $d_m$ represents satisfaction with satellite network service to the m-th user cluster, $\alpha_i$ represents anti-interference performance of the i-th target satellite $s_i$ in the target satellite set, $s_i \in I$, $I=\{, s_1, s_2, \ldots, s_i, \ldots, s_I\}$, I represents the target satellite set composed of all the target satellites, i represents a serial number of the target satellite, I represents a total number of target satellites contained in I, u' represents a linear adjustment coefficient may with a value of 1, $c_i^{(p)}$ represents a bandwidth provided by the i-th target satellite $s_i$ to the p-th population $f_p$, $f_p$ represent the p-th population corresponding to the m-th user cluster, $f_p \in F$, $F=\{f_1, f_2, \ldots, f_p, \ldots, f_P\}$, F represents a collection of all populations, p represents a serial number of population, P represents a total number of populations contained in F, $w_m$ represents satisfaction with bandwidth price to the m-th user cluster, $b_m$ represents a bandwidth requested by the m-th user cluster, $q_i$ represents a bandwidth price of the i-th target satellite $s_i$, $\Sigma$ represents a summation operation, $N^{(p')}$ represents a total number of user clusters in p'-th population $f_{p'}$, $p' \in [1, P]$, $x_{i'}^{(p')}$ represents a ratio of the number of user clusters in the p'-th population $f_{p'}$ selecting the i'-th target satellite $s_{i'}$ from the corresponding target satellite set to the total number of user clusters in the population. $x_{i'}^{(p')}$ can be calculated by the following formula:

$$x_{i'}^{(p')} = \frac{n_{i'}^{(p')}}{N^{(p')}}$$

Where, $n_{i'}^{(p')}$ represents the number of user clusters in the p'-th population $f_{p'}$ which select the target satellite $s_{i'}$ from the corresponding target satellite set. $\overline{U}^p(X)$ can be calculated by the following formula:

$$\overline{U}^p(X) = \frac{\sum_{c=1}^{N^{(p)}} U_{i^\sim}^{p,c}(X)}{N^{(p)}}$$

Where, c represents serial number of user clusters in the p-th population $f_p$, $c \in [1, N^{(p)}]$, $N^{(p)}$ represents a total number of user clusters in the p-th population $f_p$, $i^\sim$ represents a serial number of the $i^\sim$-th target satellite $s_{i^\sim}$, $s_{i^\sim} \in I$.

In the $3^{rd}$ step, determining whether $U_i^{p,m}(X) < \overline{U}^p(X)$ is satisfied or not, if YES (i.e., $U_i^{p,m}(X) < \overline{U}^p(X)$ is satisfied), going to a $4^{th}$ step, otherwise going to an $8^{th}$ step.

In the $4^{th}$ step, selecting an unselected target satellite from the target satellite set.

In the $5^{th}$ step, calculating, by the centralized decision unit of the handover decision point of managing the LEO satellite, a utility function $U_j^{p,m}(X)$ of the selected user cluster selecting the target satellite selected in the $4^{th}$ step in the corresponding population.

In the $6^{th}$ step, determining whether $U_j^{p,m}(X) \geq U_i^{p,m}(X)$ is satisfied or not, if YES, switching the user cluster selected in the $1^{st}$ step to the target satellite selected in the $4^{th}$ step, otherwise going to a $7^{th}$ step.

In the $7^{th}$ step, determining whether all target satellites in the target satellite set have been selected, if YES, switching the user cluster selected in the $1^{st}$ step to the target satellite selected in the $2^{nd}$ step, otherwise returning to the $4^{th}$ step.

In the $8^{th}$ step, determining whether all user clusters of each LEO satellite have been selected, if YES, switching each user cluster in each population of each LEO satellite to the corresponding target satellite, otherwise, returning to the $1^{st}$ step.

In step 8, the distributed decision unit performs distributed inter-satellite handovers on all the user clusters of each LEO satellite. As an illustrated embodiment, a core idea of an algorithm for the distributed inter-satellite handovers can refer to that of the distributed algorithm proposed by M. Theodorou and M. Paterakis, entitled "*Design and performance evaluation of a Distributed algorithm for heterogeneous multichannel CRNs*", 2016 IEEE, pp. 309-314.

Specifically, the user clusters with identical target satellite sets of each LEO satellite may be collected as a population.

The target satellite selected for the cluster head of each user cluster may be used as the target satellite selected for all users in the user cluster.

By using a distributed Q-learning algorithm, each user cluster in each population of each LEO satellite may be switched to the selected target satellite.

The distributed Q-learning algorithm may include steps as follows:

In the $1^{st}$ step, setting K as a total number of cycles, k=1, and k as a current cycle.

In the $2^{nd}$ step, setting a decision knowledge value obtained by each user cluster of each LEO satellite selecting any one target satellite of a target satellite set in a corresponding population as 0. As an illustrated embodiment, the decision knowledge value can refer to the q-values $Q_t(s_t, a_t)$ proposed by J. Sharma, P.-A. Andersen, O.-C. Granmo and M. Goodwin, entitled "*Deep Q-Learning with Q-Matrix Transfer Learning for Novel Fire Evacuation Environment*", in IEEE Transactions on Systems, Man, and Cybernetics: System, Vol. 51, No. 12, pp. 7363-7381, December 2021.

In the $3^{rd}$ step, selecting an unselected user cluster from the M user clusters of each LEO satellite.

In the $4^{th}$ step, determining whether rand( )≤γ is satisfied or not, if YES, going to the following $5^{th}$ step, otherwise going to the following $6^{th}$ step. rand( ) may be used to generate a random number between 0 to 1, 7 represents an exploration probability may with a value of 0.1.

In the $5^{th}$ step, randomly selecting, for the selected user cluster, any one target satellite of the target satellite set, and going to the following $7^{th}$ step.

In the $6^{th}$ step, selecting, for the selected user cluster, the target satellite with a maximum decision knowledge value in the target satellite set, and going to the following $7^{th}$ step.

In the $7^{th}$ step, calculating a utility function $U_i^{p,m}(X)$ for the selected user cluster selecting the target satellite selected in one of the $5^{th}$ step and the $6^{th}$ step in the corresponding population, by the distributed decision unit of the handover decision point of managing the target satellite selected in the one of the $5^{th}$ step and the $6^{th}$ step.

In the $8^{th}$ step, updating the decision knowledge value of the selected user cluster selecting the target satellite in the $7^{th}$ step in the corresponding population. A formula for updating the decision knowledge is as follows:

$$Q_i^m(k+1)=(1-\lambda)*Q_i^m(k)+\lambda(U_i^{p,m}(X)+\beta \max_{i\in I}Q_i^m(k))$$

Where, λ represents a learning rate may with a value of 0.1, β represents an attenuation factor may with a value of 0.2.

In the $9^{th}$ step, determining whether all user clusters of each LEO satellite have been selected, if YES, going to the following $10^{th}$ step, otherwise keeping k unchanged and returning to the $3^{rd}$ step.

In the $10^{th}$ step, letting k=k+1, determining whether k≤K is satisfied or not, if YES, returning to the $3^{rd}$ step, otherwise switching each user cluster in each population of each LEO satellite to the target satellite selected in the $7^{th}$ step.

Effects of the present disclosure will be further described below in combination with a simulation experiment of the present disclosure.

1. Conditions of the Simulation Experiment:

Platforms for the simulation experiment of the present disclosure are Windows 10 operating system and Matlab2014b.

In the simulation experiment of the present disclosure, the number of handover users connected to a LEO satellite is set to be 6000, the number of user clusters is 200, a target satellite set of each of the user clusters is $\{s_1, s_2, s_3, s_4, s_5, s_6\}$, the 200 user clusters form one population, and 6 target satellites allocate bandwidth resources of [7000,7000,5000, 7000,5000, 5000]Mb for the population.

Figure 3:
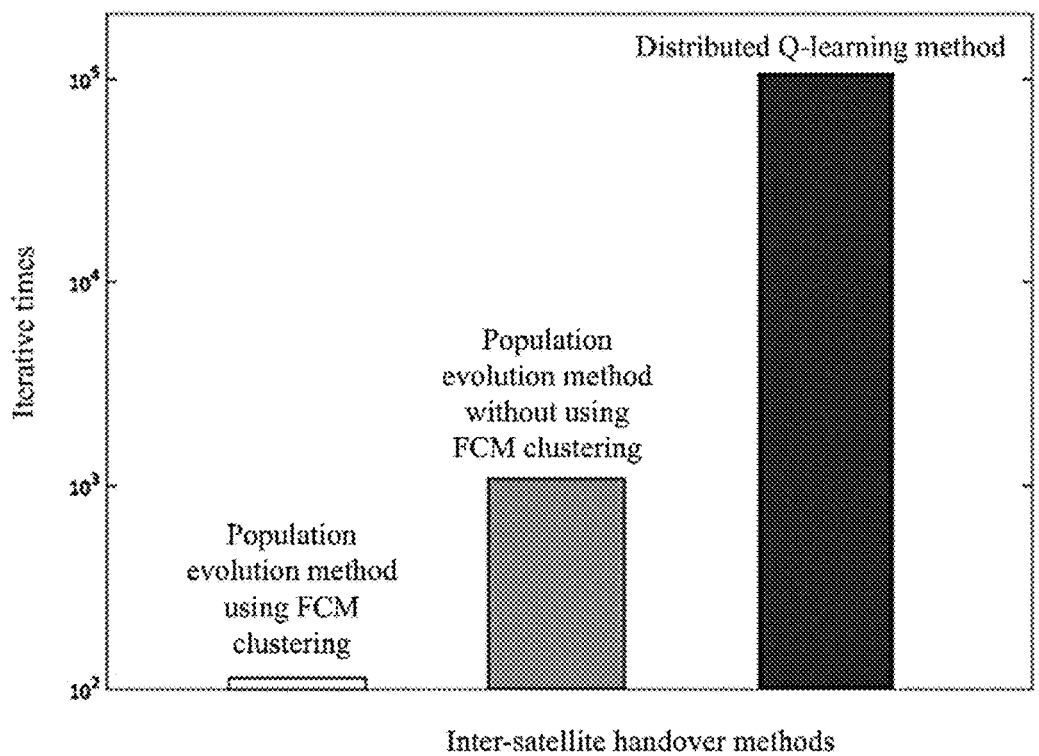
FIG. 3 illustrates a histogram of results for iterative times of three kinds of inter-satellite handover methods according to the present disclosure.
Figure 4:
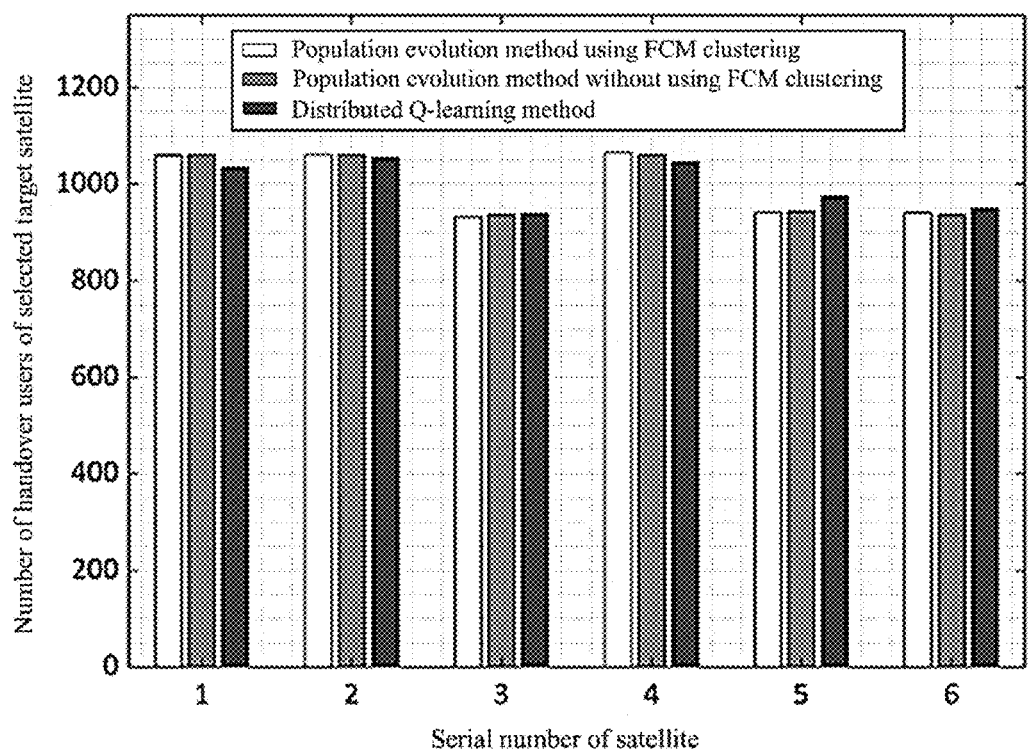
FIG. 4 illustrates a histogram of results for the numbers of handover users of each target satellite under three kinds of inter-satellite handover methods according to the present disclosure.

2. Simulation Content and Results Analysis:

The simulation experiment of the present disclosure is to simulate the following three kinds of inter-satellite handover methods, and obtain iterative times of the three kinds of inter-satellite handover methods and the number of handover users selecting each of the target satellites under the three kinds of inter-satellite handover methods. The software Matlab2014b is used to draw a histogram of results for iterative times of the three kinds of inter-satellite handover methods (as shown in FIG. 3) and a histogram of results for the number of handover users of target satellites under the three kinds of inter-satellite handover methods (as shown in FIG. 4).

The three kinds of inter-satellite handover methods may refer to the following first method through third method.

The first method, for each target satellite in target satellite sets of all user clusters of the LEO satellite belonging to LEO satellites in a management domain of a handover decision point of managing the LEO satellite, uses the FCM clustering method proposed in the step 4 of the present disclosure and then performs the population evolution algorithm proposed in the step 7 of the present disclosure, and thus is referred to as a population evolution method using FCM clustering.

The second method, for each target satellite in target satellite sets of all user clusters of the LEO satellite belonging to LEO satellites in a management domain of a handover decision point of managing the LEO satellite, uses a population evolution method without FCM clustering, and is referred to as a population evolution method without using FCM clustering. The population evolution method without FCM clustering in the related technologies can refer to the population evolution method proposed by D. Niyato et al., entitled "*Dynamics of Network Selection in Heterogeneous Wireless Networks: An Evolutionary Game Approach*", IEEE Transactions on Vehicular Technology, Vol. 58, No. 4, pp. 2008-2017, May 2009", which does not perform FCM clustering before executing the method.

The third method, for each target satellite in target satellite sets of all user clusters of the LEO satellite belongs to LEO satellites in a management domain of a handover decision point of managing the LEO satellite, uses the clustering method proposed in the step 4 of the present disclosure and then performs the distributed Q-learning algorithm proposed in the step 8 of the present disclosure, and is referred to as distributed Q-learning method.

Effects of the present disclosure will be further described in combination with the simulation results of FIG. 3 and FIG. 4.

In FIG. 3 and FIG. 4, the white rectangular boxes in FIG. 3 and FIG. 4 correspond to the population evolution method using FCM clustering, the grey rectangular boxes correspond to the population evolution method without using FCM clustering, and the black rectangular boxes correspond to the distributed Q-learning method.

As seen from FIG. 3, the population evolution algorithm using FCM clustering has the least iteration times and the fastest convergence speed, even one order of magnitude lower than the population evolution algorithm without using FCM clustering. When the number of handover users increases, the population evolution algorithm using FCM clustering can reduce the decision time of target satellite selection and reduce the cost of handover decision. As to the distributed Q-learning method, its iteration times are more than that of the population evolution algorithm using FCM clustering and the population evolution algorithm without using FCM clustering, but it can further realize inter-satellite handovers for handover users in the management domain of a handover decision point by different handover decision points (which are used as distributed control entities).

As seen from FIG. 4, in the three kinds of inter-satellite handover methods, the handover users select corresponding target satellites as per the bandwidth resources of 6 target satellites, which can ensure load balancing of target satellites. Among the three kinds of inter-satellite handover methods, the numbers of handover users selecting each target satellite are approximately the same. Moreover, among the three kinds of inter-satellite handover methods, utility function values of populations calculated are approximately the same, in which, the utility function value of the population of the population evolution method using FCM clustering is −4.0391, the utility function value of the population of the population evolution method without using FCM clustering is −4.0381, and the utility function value of the population of the distributed Q-learning method is −4.0320. The results shown in FIG. 4 illustrate the three kinds of inter-satellite handover methods each can make each handover user obtain satellite bandwidth resource as much as possible and improve bandwidth resource utilization of target satellites.

The above description is only illustrated embodiments of the present disclosure and is not intended to limit the present disclosure. Any modification, equivalent replacement, improvement, etc. made within the spirit and principle of the present disclosure shall be included in the protection scope of the present disclosure.

What are not described in detail in the present disclosure is known to those skilled in the technology.

What is claimed is:

1. A lightweight inter-satellite handover device for a mega low-earth-orbit (LEO) satellite network, comprising: a management information storage function module and a handover target decision function module, both configured a handover decision point; wherein the management information storage function module comprises a LEO satellite information storage unit and a user information storage unit; the handover target decision function module comprises an attribute extraction sub-module, a cluster sub-module, a decision set generator sub-module and a decision sub-module; and the decision sub-module comprises a centralized decision unit and a distributed decision unit;

wherein the LEO satellite information storage unit is configured to store management domain information of the handover decision point and output the management domain information to the decision set generator sub-module;

wherein the user information storage unit is configured to store the attribute of each of handover users in a management domain of the handover decision point and output the stored information to the attribute extraction sub-module;

wherein the attribute extraction sub-module is configured to extract the attribute of each of the handover users of each of the LEO satellites in the management domain of the handover decision point and output the extracted information to the cluster sub-module;

wherein the cluster sub-module is configured to perform clustering based on the attribute of each of the handover users of each of the LEO satellites and determine cluster heads of user clusters, the determination of cluster heads of user clusters comprises: determining a number M of the user clusters based on the number of the handover users of each of the LEO satellites, and classifying the handover users with target attribute values into one user cluster by using fuzzy c-mean (FCM) clustering to obtain the cluster head of the user cluster, where M is a positive integer greater than 1;

wherein the decision set generator sub-module is configured to generate target satellite sets of the user clusters, determine each of the target satellites in the target satellite sets of the user clusters of each of the LEO satellites whether belongs to the LEO satellites in the management domain of the handover decision point of managing the LEO satellite based on the management domain information in the LEO satellite information storage unit, and perform centralized inter-satellite handovers on the user clusters of each of the LEO satellites by the centralized decision unit when each of target satellites in the target satellite sets of the user clusters of each of the LEO satellites belongs to the LEO satellites in the management domain of the handover decision point of managing the LEO satellite, otherwise perform distributed inter-satellite handovers on the user clusters of each of the LEO satellites by the distributed decision unit;

wherein the management information storage function module comprising the LEO satellite information storage unit and the user information storage unit, and the handover target decision function module comprising the attribute extraction sub-module, the cluster sub-module, the decision set generator sub-module and the decision sub-module including the centralized decision unit and the distributed decision unit are software modules stored in one or more memories and executable by one or more processor coupled to the one or more memories.

2. A lightweight inter-satellite handover method for a mega LEO satellite network, applied to the device as claimed in claim 1, clustering handover users into user clusters based on the attribute of each of the handover users of each of the LEO satellites in the mega LEO satellite network, and performing centralized inter-satellite handovers on the user clusters of each of the LEO satellites when each of the target satellites in target satellite sets of the user clusters of each of the LEO satellites belongs to LEO satellites in a management domain of a handover decision point of managing the LEO satellite, otherwise performing distributed inter-satellite handovers on the user clusters of each of the LEO satellites; wherein the method specifically comprises:

(1) connecting the handover user in the mega LEO satellite network to any one LEO satellite visible to the handover user;

(2) storing management domain information of the handover decision point and outputting the management domain information to the decision set generator sub-module by the LEO satellite information storage unit, storing the attribute of each of the handover users in the management domain and outputting the stored information to the attribute extraction sub-module by the user information storage unit;

(3) extracting the attribute of each of the handover users of each of the LEO satellites in the management domain of the handover decision point and outputting the extracted information to the cluster sub-module by the attribute extraction sub-module;

(4) performing clustering based on the attribute of each of the handover users of each of the LEO satellites and determining cluster heads of user clusters by the cluster sub-module, wherein the determining cluster heads of user clusters comprises: determining a number M of the user clusters based on the number of the handover users of each of the LEO satellites, and classifying the handover users with target attribute values into one user cluster by using FCM clustering to obtain the cluster head of the user cluster;

(5) generating a target satellite set of each of the user clusters by the decision set generator sub-module, comprising:

(5a) periodically broadcasting, by each of the satellites in the mega LEO satellite network, resource information of the satellite;

(5b) forming, by each handover user, a measurement report of the handover user based on received broadcast information and a signal intensity of the broadcast information;

(5c) feeding back, by each handover user, the measurement report to LEO satellite connected thereto; feeding back, by the LEO satellite, the received measurement report to the handover decision point of managing the LEO satellite; and receiving, by the decision set generator sub-module in the handover decision point, the measurement report of each handover user;

(5d) classifying, by the decision set generator sub-module, the received measurement reports of the handover users into M groups based on the M user clusters; and acquiring the target satellite set of each of the user clusters according to a corresponding group of measurement reports;

(6) determining, by the decision set generator sub-module, each of the target satellites in the target satellite sets of the user clusters of each of the LEO satellites whether belongs to the LEO satellites in the management domain of the handover decision point of managing the LEO satellite based on the management domain information in the LEO satellite information storage unit, and executing step (7) when each of the target satellites in the target satellite sets of the user clusters of each of the LEO satellites belongs to the LEO satellites in the management domain of the handover decision point of managing the LEO satellite, otherwise executing step (8);

(7) performing centralized inter-satellite handovers on the user clusters of each of the LEO satellites by the centralized decision unit, comprising:

(7a) collecting the user clusters with identical target satellite sets of each LEO satellite as a population;

(7b) taking a target satellite selected for the cluster head of each user cluster as the target satellite selected for users in the user cluster;

(7c) switching each user cluster in each population of each LEO satellite to the target satellite by a population evolution method;

(8) performing distributed inter-satellite handovers on the user clusters of each of the LEO satellites by the distributed decision unit, comprising:

(8a) collecting the user clusters with identical target satellite sets of each LEO satellite as a population;

(8b) taking a target satellite selected for the cluster head of each user cluster as the target satellite selected for users in the user cluster;

(8c) switching each user cluster in each population of each LEO satellite to the target satellite by a distributed Q-learning method.

3. The lightweight inter-satellite handover method for the mega LEO satellite network as claimed in claim 2, wherein in step (2), the management domain information of the handover decision point refers to that: in a region where ground station deployment is restricted, a middle-earth-orbit (MEO) satellite is used as the handover decision point, and a ground station is used as the handover decision point in an unrestricted region; the management domain information of the handover decision point comprises: the LEO satellites as managed, the handover users of each of the LEO satellites, and a coverage area served by each of the LEO satellites for the handover users; each of the LEO satellites only exists in the management domain of a handover decision node, and the handover decision point is responsible for target satellite selection of the handover users in the management domain.

4. The lightweight inter-satellite handover method for the mega LEO satellite network as claimed in claim 2, wherein in step (2), the attribute of the handover user comprises: bandwidth requirement, satisfaction with satellite network service to the handover user, and satisfaction with bandwidth price to the handover user; a value of the satisfaction with satellite network service is in a range of [1.2, 2.0], and a value of the satisfaction with bandwidth price is in a range of [1.2, 3.0].

5. The lightweight inter-satellite handover method for the mega LEO satellite network as claimed in claim 2, wherein in step (5a), the resource information of the satellite comprises: remaining bandwidth resource of the satellite, bandwidth price of the satellite, and anti-interference performance of the satellite.

6. The lightweight inter-satellite handover method for the mega LEO satellite network as claimed in claim 2, wherein the population evolution method in step (7c) comprises the $1^{st}$ step through the $8^{th}$ step as follows:

in the $1^{st}$ step, selecting an unselected user cluster from the M user clusters of each LEO satellite;

in the $2^{nd}$ step, calculating, by the centralized decision unit of the handover decision point of managing the LEO satellite, a utility function $U_i^{p,m}(X)$ for the cluster head of the selected user cluster which selects any one target satellite from the corresponding target satellite set in the corresponding population and a utility function $\bar{U}^p(X)$ of the corresponding population; $U_i^{p,m}(X)$ being calculated by a formula as:

$$U_i^{p,m}(X) = (1+d_m)^{\alpha_i} \times u' \times \left( \frac{c_i^{(p)}}{\sum_{p'=1}^{P} N^{(p')} \times x_i^{(p')}} \right) - w_m \times b_m \times q_i \times \sum_{p'=1}^{P} \left( N^{(p')} \times x_i^{(p')} \right)$$

where, $d_m$ represents satisfaction with satellite network service to the m-th user cluster, $\alpha_i$ represents anti-interference performance of the i-th target satellite $s_i$ in the target satellite set, $s_i \in I$, $I=\{s_1, s_2, \ldots, s_i, \ldots, s_I\}$, I represents the target satellite set composed of the target satellites, i represents a serial number of target satellite, I represents a total number of target satellites contained in I, u' represents a linear adjustment coefficient, $c_i^{(p)}$ represents a bandwidth provided by the i-th target satellite $s_i$ to the p-th population $f_p$, $f_p$ represent the p-th population corresponding to the m-th user cluster, $f_p \in F$, $F=\{f_1, f_2, \ldots, f_p, \ldots, f_P\}$, F represents a collection of populations, p represents a serial number of population, P represents a total number of populations contained in F, $w_m$ represents satisfaction with bandwidth price to the m-th user cluster, $b_m$ represents a bandwidth requested by the m-th user cluster, $q_i$ represents a bandwidth price of the i-th target satellite $s_i$, $\Sigma$ represents a summation operation, $N^{(p')}$ represents a total number of user clusters in the p'-th population $f_{p'}$, $p' \in [1,P]$, $x_i^{(p')}$ represents a ratio of the number of user clusters in the p'-th population $f_{p'}$ selecting the i'-th target satellite $s_{i'}$ in the corresponding target satellite set to the total number of user clusters in the population; $x_i^{(p')}$ being calculated by a formula as:

$$x_{i'}^{(p')} = \frac{n_{i'}^{(p')}}{N^{(p')}}$$

where, $n_i^{(p')}$ represents the number of user clusters in the p'-th population $f_{p'}$ which select the target satellite $s_{i'}$ in the corresponding target satellite set; $\bar{U}^p(X)$ being calculated by a formula as:

$$\bar{U}^p(X) = \frac{\sum_{c=1}^{N^{(p)}} U_{\tilde{i}}^{p,c}(X)}{N^{(p)}}$$

where, c represents serial number of user clusters in the p-th population $f_p$, $c \in [1, N^{(p)}]$, $N^{(p)}$ represents a total number of user clusters in the p-th population $f_p$, $\tilde{i}$ represents a serial number of the $\tilde{i}$-th target satellite $s_{\tilde{i}}$, $s_{\tilde{i}} \in I$;

in the $3^{rd}$ step, determining whether $U_i^{p,m}(X) < \bar{U}^p(X)$ is satisfied or not, if YES, going to the $4^{th}$ step, otherwise going to the $8^{th}$ step;

in the $4^{th}$ step, selecting an unselected target satellite from the target satellite set;

in the $5^{th}$ step, calculating, by the centralized decision unit of the handover decision point of managing the LEO satellite, a utility function $U_j^{p,m}(X)$ of the cluster head of the selected user cluster selecting the target satellite selected in the $4^{th}$ step in the corresponding population;

in the $6^{th}$ step, determining whether $U_j^{p,m}(X) \geq U_i^{p,m}(X)$ is satisfied or not, if YES, switching the user cluster selected in the $1^{st}$ step to the target satellite selected in the $4^{th}$ step, otherwise going to a $7^{th}$ step;

in the $7^{th}$ step, determining whether all target satellites in the target satellite set have been selected, if YES, switching the user cluster selected in the $1^{st}$ step to the target satellite selected in the $2^{nd}$ step, otherwise returning to the $4^{th}$ step;

in the $8^{th}$ step, determining whether all user clusters of each LEO satellite have been selected, if YES, switching each user cluster in each population of each LEO satellite to the corresponding target satellite, otherwise returning to the $1^{st}$ step.

7. The lightweight inter-satellite handover method for the mega LEO satellite network as claimed in claim 2, wherein the distributed Q-learning method in step (8c) comprises the $1^{st}$ step through the $10^{th}$ step as follows:

in the $1^{st}$ step, setting K as a total number of cycles, k=1, and k as a current cycle;

in the $2^{nd}$ step, setting a decision knowledge value obtained by each user cluster of each LEO satellite selecting any one target satellite of the target satellite set in the corresponding population as 0;

in the $3^{rd}$ step, selecting an unselected user cluster from the M user clusters of each LEO satellite;

in the $4^{th}$ step, determining whether rand( )≤γ is satisfied or not, if YES, going to the $5^{th}$ step, otherwise going to the $6^{th}$ step; where rand( ) is configured to generate a random number between 0 to 1, where γ represents an exploration probability with a value of 0.1;

in the $5^{th}$ step, randomly selecting, for the selected user cluster, any one target satellite of the target satellite set, and going to the $7^{th}$ step;

in the $6^{th}$ step, selecting, for the selected user cluster, the target satellite with a maximum decision knowledge value from the target satellite set, and going to the $7^{th}$ step;

in the $7^{th}$ step, calculating a utility function $U_i^{p,m}(X)$ for the selected user cluster selecting the target satellite selected in one of the $5^{th}$ step and the $6^{th}$ step in the corresponding population, by the distributed decision unit of the handover decision point of managing the target satellite selected in the one of the $5^{th}$ step and the $6^{th}$ step;

in the $8^{th}$ step, updating the decision knowledge value of the selected user cluster selecting the target satellite in the $7^{th}$ step in the corresponding population, a formula for updating the decision knowledge is as:

$$Q_i^m(k+1)=(1-\lambda)*Q_i^m(k)+\lambda(U_i^{p,m}(X)+\beta \max_{i \in I} Q_i^m(k))$$

where, λ represents a learning rate with a value of 0.1, β represents an attenuation factor with a value of 0.2;

in the $9^{th}$ step, determining whether all user clusters of each LEO satellite have been selected, if YES, going to the $10^{th}$ step, otherwise keeping k unchanged and returning to the $3^{rd}$ step;

in the $10^{th}$ step, letting k=k+1, determining whether k≤K is satisfied or not, if YES, returning to the $3^{rd}$ step, otherwise switching each user cluster in each population of each LEO satellite to the target satellite selected in the $7^{th}$ step.

* * * * *